Patented Mar. 18, 1941

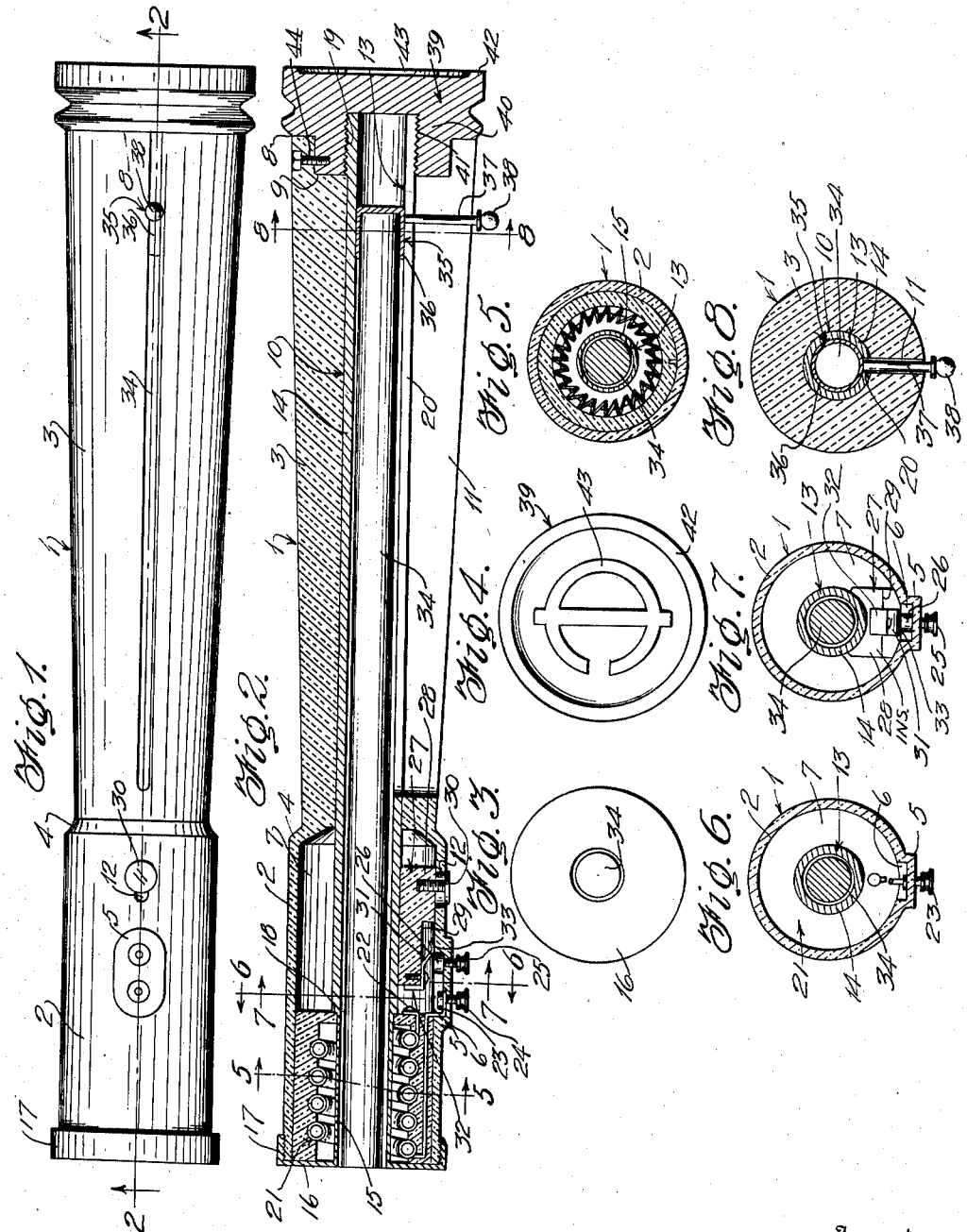

2,235,738

UNITED STATES PATENT OFFICE 2,235,738

SEALING TOOL

Florence Staley Curtis, Millvillage, Pa.

Application November 1, 1937, Serial No. 172,300

2 Claims. (Cl. 219—21)

This invention relates to a sealing tool designed primarily for use in connection with the sealing of letters, but it is to be understood that a tool, in accordance with this invention, is for use in any other connection for which it may be found applicable, and the invention has for its object to provide, in a manner as hereinafter set forth, a tool of the class referred to for applying an identified sealing means to a letter.

A further object of the invention is to provide, in a manner as hereinafter set forth, a tool of the class referred to capable of being replenished with successive sticks of sealing material after one stick has been used in connection with the providing of identified seals.

A further object of the invention is to provide, in a manner as hereinafter set forth, a tool of the class referred to including an electric heater for melting the sealing material during the operation of applying an identified sealing means.

A further object of the invention is to provide, in a manner as hereinafter set forth, a tool of the class referred to including an outlet for melted sealing material to provide the latter forming the body of the seal and with means for identifying said body.

A further object of the invention is to provide, in a manner as hereinafter set forth, a tool of the class referred to including an electrical controlled heating means for melting successive portions of a sealing material and a removably mounted shiftable means for feeding the successive portions of the sealing material to a point to be melted by the heating means.

A further object of the invention is to provide, in a manner as hereinafter set forth, a tool of the class referred to including a sealing material guide and means whereby such guide may be conveniently supplied with sealing material when occasion requires.

Further objects of the invention are to provide, in a manner as hereinafter set forth, a tool for the purpose referred to which is simple in its construction and arrangement, strong, durable, thoroughly efficient in its use, conveniently handled, pleasing in appearance and comparatively inexpensive to manufacture.

With the foregoing and other objects which may hereinafter appear, the invention consists of the novel construction, combination and arrangement of parts as will be more specifically described and illustrated in the accompanying drawing, wherein is shown an embodiment of the invention, but it is to be understood that changes, variations and modifications may be resorted to which fall within the scope of the invention as claimed.

In the drawing:

Figure 1 is a side elevation of the tool,

Figure 2 is a section on line 2—2, Figure 1,

Figure 3 is an elevation looking towards the discharge end of the tool,

Figure 4 is a view looking towards that end of the tool provided with the seal identifying means, Figure 5 is a section on line 5—5, Figure 2, Figure 6 is a section on line 6—6, Figure 2, Figure 7 is a section on line 7—7, Figure 2, and Figure 8 is a section on line 8—8, Figure 2.

The tool includes a tubular casing or housing 1 open at each end and formed of end portions 2, 3 and an intermediate portion 4. The portion 2 centrally of and intermediate the ends of its bottom has a depending part 5. The portion 2 and part 5 are cut out to form a recess 6 which opens into a chamber 7 provided by portion 2. The portion 3 constitutes a handle which gradually decreases in outer diameter from its outer end 8 to portion 4. The inner diameter of portion 3 is uniform from its inner end to a point inwardly adjacent its outer end 8. The inner portion of the outer end edge of portion 3 is formed with a split annular rabbet 9. The inner face of portion 3 provides a channel 10 for supporting a sealing material guide to be referred to. The channel 10 is of materially less diameter than and aligns with the axis of chamber 7. That part of greatest diameter of the portion 4 merges into the inner end of portion 2. That part of smallest diameter of the portion 4 merges into the inner end of portion 3. The outer diameter of the portion 3 at its inner end is less than the outer diameter of portion 2. The portion 3 is formed lengthwise thereof with a narrow slot 11 which extends from a point in proximity to the inner end of portion 3 to the outer end of the latter, through rabbet 9 and opens into channel 10. The slot 11 has a closed inner end, an open outer end and opens at the outer periphery of portion 3. The thickness of the body of portion 2 is materially less than the body of portion 3. The body of portion 2 rearwardly of recess 6 is formed with a lengthwise extending slot 12. The casing or housing 1 is formed throughout of any suitable non-conducting material.

Mounted in the channel 10 and extending forwardly and rearwardly with respect thereto is a combined sealing material receiving, holding and guiding element 13 of tubular form consisting of an annular part 14, an annular part 15, a circular part 16 and an interiorly threaded annular part 17 which extends rearwardly from part 16 at the outer edge of the latter and provides a flange. The parts 14 and 15 are of uniform inner diameter, but the outer diameter of part 14 is greater than the outer diameter of the part 15 whereby at the junction of the two diameters the element 13 is formed with a peripheral shoulder 18. The part 16 abuts against the outer end of the portion 2 of casing 1 whereby the outer end of chamber 7 is closed. The inner wall of chamber 7 is provided by the portion 4 of casing 1. The periphery of portion 2 is threaded for engagement with the threads on the part 17 of element 13 whereby casing 1 and element 13 are coupled together. The part 14 extends rearwardly from the channel 10 and to a point beyond the rear end 8 of portion 3. The part 14 snugly engages the wall of channel 10 and at its rear has peripheral threads 19. The part 14 is provided therein with a lengthwise slot 20 which for the major portion of its length opens into the channel 10. The slot 20 is closed at its inner end and such inner end aligns with the inner end of slot 11. The outer end of slot 20 is open.

Arranged within the chamber 7 and interposed between the shoulder 18 and part 16 of element 13 and encompassing the reduced part 15 of the element 13 is an electrical heating element 21 having one of its terminals indicated at 22 and its other terminal at 23 extending into the recess 6 and connected to a binding post 24 for a circuit wire not shown. Connected to the portion 2 of casing 1 and extending into the recess 6 is a binding post 25 for the other circuit wire not shown. Post 25 has its inner end provided with a contact 26. Slidably mounted in the chamber 7 rearwardly of the element 21, as well as being normally spaced from the latter, is a circuit opening and closing element 27 formed of a block of insulation 28 rabbeted on its lower face as at 29 for spacing a part of the block from the portion 2 of the casing 1. Secured to block 28 and extending through the slot 12 is a thumb or finger piece 30 to facilitate the shifting of the element towards and from terminal 22 for the purpose of closing and opening the circuit for the heating element 21. The element 27 has attached thereto an angle-shaped circuit opening and closing member 31 having the part 32 thereof for engaging contact 22 and the part 33 thereof for engaging contact 26. The part 33 is resilient and is normally free of contact 26. When element 27 is shifted forwardly the part 32 thereof will engage contact 22 and the part 33 will seat on contact 26 whereby the heating circuit is closed. The heating element 21 is provided for melting the sealing material to be referred to and the melting material can be supplied to the envelope to constitute the body portion of the identified seal.

The sealing material 34 preferably wax, is in the form of a stick of less length than casing 1 and possesses the characteristic that it may be readily melted by the heating element 21 and discharged from the outer end of the part 15 of the element 13. The stick of sealing material 34 is to have attached to its inner end a manually operated feed element 35. The element 35 consists of a cap 36 mounted on the rear end of the stick 34 and a pusher-bar 37 anchored to cap 36 and extending through the slots 20 and 11. The pusher-bar 37 has a globular thumb or finger piece 38 arranged exteriorly of the casing 1. The stick 34 with the element 35 mounted thereon is inserted into the tool from the rear end of casing 1 through the open ends of the slots 20 and 11.

The tool includes a combined closure and impression element 39 formed of a cap-like body 40 provided with internal threads 41 for engagement with the threads 19. The element 39 includes an annular flange 42. When the element 39 is mounted in position, it extends into the rabbet 9 and abuts the end 8 of casing 1 whereby the outer end of the latter, as well as the outer end of element 13 is closed and as the threads 19 and 41 interengage the element 13 is connected to the element 39. The outer face of the latter is formed with an impressing means 43 for action on the deposited sealing material to provide the latter with a monogram or other characteristic for the purpose of identifying the seal. The element 39 is connected to the casing 1 by a screw 44 countersunk in the casing 1 and engaging with the body 40.

If the stick of material 34 has not been completely melted off of the element 35 when the pusher-bar 37 abuts the inner ends of the slots 11 and 20, the element 35 will be disconnected from the stick 34 and removed from the tool. Prior to removal the element 39 is disconnected from casing 1 and element 13. The element 35 is then mounted on a stick of material 34 of less length than the stick shown in Figure 2, but of a length to abut the inner end of the remaining portion of the stick in the tool, and after which the element 39 is mounted in position. The new stick which has been positioned in the tool, and in connection with the element 35, will be utilized to force the short piece of stick to be acted upon by the heater 21.

When using the tool the material 34 is melted by the heater and deposited on the letter. After a sufficient amount of the material 34 has been supplied to the letter to form the body of the seal, the element 39 is then brought into action to impress an identifying means on the body of the seal. When element 39 is used, the heating circuit is opened.

What I claim is:

1. In a tool for the purpose set forth, a one-piece casing open at its forward and rear ends and formed with an open front annular chamber at its forward end portion, a tubular combined receiving, holding and guiding element for sealing material of stick-like form, said element including a tube of uniform inner diameter open at its forward and rear ends and a laterally and rearwardly extending means at the forward end of said tube for closing the open front of the chamber, closing the forward end of the casing and for connecting said element and casing together, said tube extending from the forward end of said casing through said chamber to beyond the rear end of the latter and forming the inner wall of said chamber, a normally inactive electric heater arranged within said chamber and encompassing a portion of said element, controlling means for the heater carried by said casing, a closure common to the rear end of said element and casing, said element and closure having coacting means for detachably connecting them together, means for connecting the closure to said casing, and a manually shiftable sealing material feeding means having a part slidably mounted in said element for connection to the rear end of the stick of material and a part extended through the body of said element and casing, the said element and casing having registering means to provide clearance for the operation of the feeding means.

2. In a tool for the purpose set forth, a one-piece casing open at its forward and rear ends and formed with an open front annular chamber at its forward end portion, a tubular combined receiving, holding and guiding element for sealing material of stick-like form, said element including a tube of uniform inner diameter open at its forward and rear ends and a laterally and rearwardly extending means at the forward end of said tube for closing the open front of the chamber, closing the forward end of the casing and for connecting said element and casing together, said tube extending from the forward end of said casing through said chamber to beyond the rear end of the latter and forming the inner wall of said chamber, a normally inactive electric heater arranged within said chamber and encompassing a portion of said element, controlling means for the heater carried by said casing, a closure common to the rear end of said element and casing, said element and closure having coacting means for detachably connecting them together, means for connecting the closure to said casing, and a manually shiftable sealing material feeding means having a part slidably mounted in said element for connection to the rear end of the stick of material and a part extended through the body of said element and casing, the said element and casing having registering means to provide clearance for the operation of the feeding means, said tube having a part of the said portion thereof arranged in said chamber of reduced outer diameter to provide a peripheral shoulder which abuts said heater.

FLORENCE STALEY CURTIS.